(12) United States Patent
Heren et al.

(10) Patent No.: US 8,333,069 B2
(45) Date of Patent: Dec. 18, 2012

(54) HYDROSTATIC TRANSMISSION DEVICE FOR A HEAVY VEHICLE

(75) Inventors: Jean Heren, Margny les Compiegne (FR); Philippe Lucienne, Aumont en Halatte (FR); Andre Prigent, Saintines (FR); Cyrille D'Hersignerie, Canly (FR)

(73) Assignee: Poclain Hydraulics Industrie, Verberie (FR)

( * ) Notice: Subject to any disclaimer, the term of this patent is extended or adjusted under 35 U.S.C. 154(b) by 690 days.

(21) Appl. No.: 12/523,083

(22) PCT Filed: Jan. 22, 2008

(86) PCT No.: PCT/FR2008/050093
§ 371 (c)(1),
(2), (4) Date: Jul. 14, 2009

(87) PCT Pub. No.: WO2008/107603
PCT Pub. Date: Sep. 12, 2008

(65) Prior Publication Data
US 2010/0043423 A1    Feb. 25, 2010

(30) Foreign Application Priority Data
Jan. 22, 2007    (FR) ..................... 07 52800

(51) Int. Cl.
*B60K 17/10* (2006.01)
*B60K 17/356* (2006.01)
(52) U.S. Cl. ............... 60/484; 60/425; 60/468; 180/242; 180/308
(58) Field of Classification Search .................... 60/325, 60/484, 425, 468, 479; 180/242, 247, 307, 180/308
See application file for complete search history.

(56) References Cited

U.S. PATENT DOCUMENTS

| | | | | |
|---|---|---|---|---|
| 3,480,099 A | * | 11/1969 | Hunck et al. ................... | 180/243 |
| 4,140,196 A | * | 2/1979 | Brewer ......................... | 180/242 |
| 4,496,845 A | * | 1/1985 | Ensign et al. .................. | 290/43 |
| 4,782,662 A | * | 11/1988 | Reeves et al. .................. | 60/327 |
| 5,199,525 A | * | 4/1993 | Schueler ....................... | 180/242 |
| 5,647,211 A | * | 7/1997 | Harber et al. .................. | 60/484 |
| 5,701,933 A | * | 12/1997 | Lunzman ................. | 137/596.12 |
| 6,027,302 A | * | 2/2000 | Nilsson ........................ | 414/621 |

(Continued)

FOREIGN PATENT DOCUMENTS

| | | |
|---|---|---|
| EP | 1 004 469 A2 | 5/2000 |
| EP | 1 026 024 A1 | 8/2000 |
| FR | 2 885 982 A1 | 11/2006 |

OTHER PUBLICATIONS

International Search Report: PCT/FR2008/050093.

*Primary Examiner* — Thomas E. Lazo
*Assistant Examiner* — Logan Kraft
(74) *Attorney, Agent, or Firm* — Ladas & Parry LLP

(57) ABSTRACT

A hydrostatic transmission including a main pump, two main ducts serving respectfully as feed and as discharge for first and second hydraulic motors that serve to drive disposed one after the other. A bypass valve can take up a reduced-speed position in which the feed main orifices are connected to the discharge main duct, and an increased-speed position in which one of the motors is bypassed, the feed main orifice of the motor being connected to the discharge main duct via a bypass link, while the other main orifices continue to have their respective links. The apparatus further includes a constriction suitable for being activated to restrict the flow of fluid through the bypass link.

27 Claims, 5 Drawing Sheets

U.S. PATENT DOCUMENTS

| | | | |
|---|---|---|---|
| 6,189,641 B1 * | 2/2001 | Azuma | 180/242 |
| 6,386,307 B1 * | 5/2002 | Martin et al. | 180/242 |
| 6,408,972 B1 * | 6/2002 | Rodgers et al. | 180/197 |
| 6,488,111 B1 * | 12/2002 | McKenna et al. | 180/308 |
| 7,017,679 B2 * | 3/2006 | Sollinger et al. | 173/49 |
| 7,836,993 B2 * | 11/2010 | Heren | 180/247 |
| 2004/0200657 A1 * | 10/2004 | Stoll et al. | 180/307 |
| 2010/0043423 A1 * | 2/2010 | Heren et al. | 60/484 |

* cited by examiner

HYDROSTATIC TRANSMISSION DEVICE FOR A HEAVY VEHICLE

BACKGROUND OF THE INVENTION

The present invention relates to hydrostatic transmission apparatus for a vehicle having at least two drive members disposed one after the other in the direction of travel of said vehicle, the apparatus comprising at least two hydraulic motors suitable for driving respective ones of said drive members, each hydraulic motor having two main orifices serving respectively as feed and as discharge in a preferred direction of travel of the vehicle, a main hydraulic pump connected to two main ducts that serve respectively as feed and as discharge in the preferred direction, and a bypass valve suitable for taking up a reduced-speed position in which the feed main orifices of the motors are connected to the feed main duct, while the discharge main orifices are connected to the discharge main duct, and an increased-speed position in which at least one motor is bypassed, the feed main orifice of said motor being connected to the discharge main duct via a bypass link, while the other main orifices continue to have their respective links.

In this type of transmission, the hydraulic motors are connected in parallel to the main hydraulic pump. For operating the vehicle at reduced speed, e.g. in a working situation, such parallel connection makes it possible, as is known, to distribute the fluid between the motors as a function of their respective needs.

In order to operate the vehicle at increased speed, e.g. for traveling on the road, at least one of the motors is bypassed by the bypass link, since its feed main orifice is connected to the discharge main duct, as is the discharge main orifice of said motor.

It should be noted that the invention applies both to apparatus in which all of the motors are of single cylinder capacity, and also to apparatus in which at least one motor has a plurality of cylinder capacities that can be selected by a selector specific to the motor in question. Under such circumstances, there exists at least one situation in which the speed is higher than the speed of the reduced-speed and increased-speed situations described above. For example, a motor that is not bypassed when the bypass valve is in the increased-speed position can have two cylinder capacities. Therefore, even when the bypass valve is in its increased-speed position, there exists a situation in which the total cylinder capacity of the non-bypassed motor is active, thereby corresponding to a medium-speed situation, and another situation in which a reduced cylinder capacity of the non-bypassed motor is active, thereby corresponding to a high-speed situation.

In addition, the invention applies to apparatus having at least two motors for respectively feeding front and rear drive members of a vehicle. The vehicle may be a vehicle having two wheels, two rollers, or two sets of wheels, each of which is driven by a single motor, or indeed, for example, a vehicle having three or four wheels, each of which is driven by a respective motor.

It is known that such a vehicle can be braked, at least partially, hydrostatically, by a build-up of pressure in the main duct that serves as the discharge.

The hydrostatic braking effect is limited to the motor or to the group of motors whose main orifices are put at different pressures, by being connected to respective ones of the feed and of the discharge main ducts.

During hydrostatic braking, the pressure increases at the main orifice that is connected to the discharge. However, when the bypass valve is in its increased-speed position, both of the main orifices of the bypassed motor are connected to the discharge main duct, so that the hydrostatic braking has no effect on that motor.

Thus, only the braking torque offered by the non-bypassed motor(s) is available for slowing down the vehicle. Therefore the effectiveness of hydrostatic braking is limited.

An object of the invention is to remedy the above-mentioned drawbacks by proposing hydrostatic transmission apparatus that makes better hydrostatic braking possible, even in the increased-speed position.

This object is achieved by the fact that the apparatus of the invention further comprises constriction means suitable for being activated to restrict the flow of fluid through said bypass link.

Thus, during hydrostatic braking that is performed while the bypass valve is in its increased-speed position, even the bypassed motor(s) participate in the hydrostatic braking because the restriction in the flow of fluid in the bypass link puts the main orifices of each such bypassed motor at different pressures. In other words, the restraining torque is not only the restraining torque that is developed by the motor(s) that is/are not bypassed, but rather it is also the restraining torque that is developed by the bypassed motor and the restraining torque that is obtained by the constriction of the bypass link.

The effectiveness of hydrostatic braking is thus increased due to the restriction in the flow of fluid through the bypass link.

Advantageously, the bypass link extends between the discharge main duct and the bypass valve.

Under these conditions, the bypass valve can be situated at a node between the feed main orifice of the motor that can be bypassed, a link duct for linking with the feed main duct, and the bypass link. Depending on its position, the bypass valve can connect the main orifice of said motor to the link with the feed main duct, or to the bypass link.

Advantageously, the constriction means comprise a constriction valve suitable, in a free configuration, for enabling fluid to flow substantially freely in said bypass link when the fluid pressure in said link is less than a pressure threshold, and, in a constricted configuration, for restricting the flow of fluid in said link when said pressure is greater than said pressure threshold. The constriction valve is advantageously disposed in the bypass link.

When in its free configuration, the constriction valve makes it possible for the transmission to operate normally at increased speed, while at least one motor is bypassed, whereas said constriction valve can be placed in its constricted configuration when hydrostatic braking is necessary at a level such that the fluid pressure in the bypass link exceeds the pressure threshold.

This pressure threshold may be defined as a function of the additional hydrostatic braking torque necessary on the transmission of the vehicle. Advantageously, said threshold is at least equal to the boost pressure of the hydraulic circuit. For example, it is approximately in the range 10% to 20% of the maximum pressure of the circuit (which is, in general, defined by the pressure ratings of pressure limiters connected to the main ducts).

Advantageously, the apparatus further comprises a check valve that is disposed in parallel with the constriction valve so as to allow free flow in the bypass link, in the non-preferred direction of travel. It is also advantageous for the apparatus to further comprise means for detecting the direction of travel of the vehicle and for preventing the constriction valve from going into said constricted configuration when the non-preferred direction of travel is detected.

In a variant, advantageously, the apparatus further comprises a constriction bypass valve disposed in parallel with the constriction valve and suitable for taking up a constriction bypassed position allowing free flow in the bypass link, and a constriction active position in which the flow of fluid in the bypass link goes via the constriction valve.

Advantageously, the apparatus further comprises an electronic control unit that is suitable for acting on the basis of information relating to the conditions of travel of the vehicle either to allow the constriction valve to go into said constricted configuration or to prevent it from going into said constricted configuration.

These possibilities are particularly useful when it is desired, in certain operating situations, to sustain a high fluid flow rate in the bypass link, without causing the constriction valve to go into its position in which it restricts the flow through said link.

This applies particularly while the vehicle is travelling in its non-preferred direction (in reverse). The connection configuration of the check valve then makes it possible to obtain the desired fluid flow rate in reverse, with automatic operation that is controlled hydraulically.

When the information relating to the conditions of travel of the vehicle concerns the direction of travel of said vehicle and when the electronic control unit is associated with the means for detecting the direction of travel of the vehicle, a fluid flow is allowed in the bypass link while the vehicle is traveling in reverse.

However, there exist multiple vehicle travel conditions in which the electronic control unit can authorize or allow the constriction valve to go into its constricted configuration. For example, it might be desired to enable increased hydrostatic braking to take place under particular vehicle load conditions, or under particular conditions regarding distribution of load on the axles, and/or under particular travel conditions, whereas such a possibility might not be desirable in other situations.

Depending on the number and the placement of the drive members of the vehicle, the apparatus may further comprise at least one additional motor that, in the reduced-speed position, has its feed and discharge main orifices connected respectively to the feed and discharge main ducts and that, in the increased-speed position, has its feed main orifice connected to the discharge main duct via an additional bypass link, whereas its discharge main orifice is connected to the discharge main duct, and the apparatus further comprises additional constriction means suitable for being activated to restrict the flow of fluid in said additional bypass link.

In a variant, in the increased-speed position, the additional motor may be bypassed by having its feed main orifice connected to the discharge main duct via the bypass link, which link is common to said bypassed additional motor and to said at least one bypassed motor, whereas the discharge main orifices of said bypassed motors are connected to the discharge main duct, and the constriction means are suitable for being activated to restrict the flow of fluid in said common bypass link.

The invention can be well understood and its advantages appear more clearly on reading the following detailed description of embodiments shown by way of non-limiting example.

BRIEF DESCRIPTION OF THE DRAWING FIGURES

The description refers to the accompanying drawings, in which.

Figure 1:
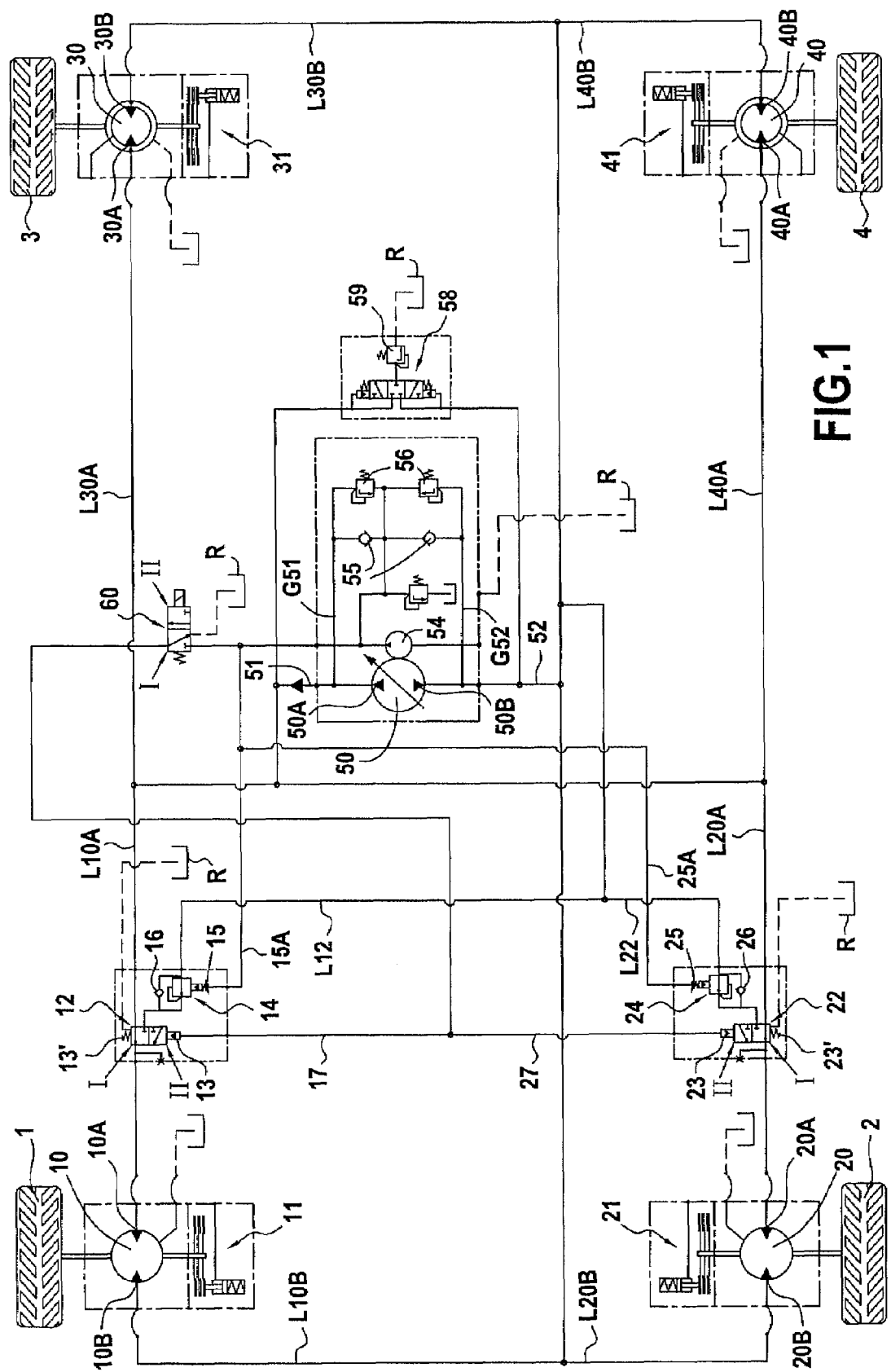
FIG. 1 shows the hydraulic circuit diagram of hydrostatic transmission apparatus of the invention, in a first embodiment.
Figure 3:
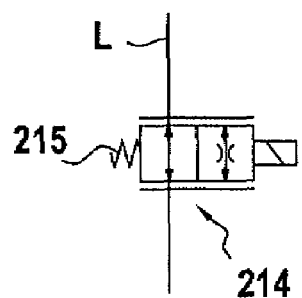
Figure 4:
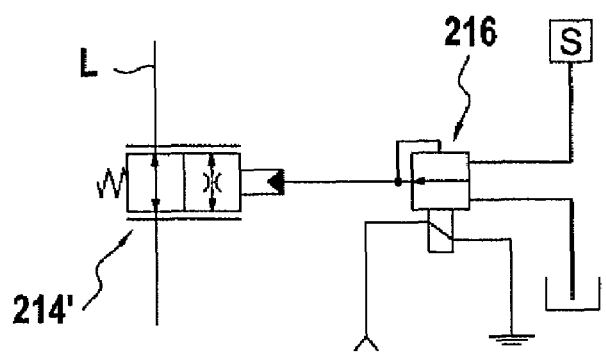
Figure 5:
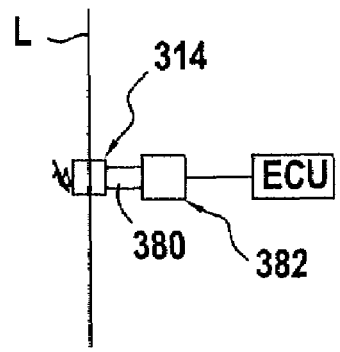
Figure 6:
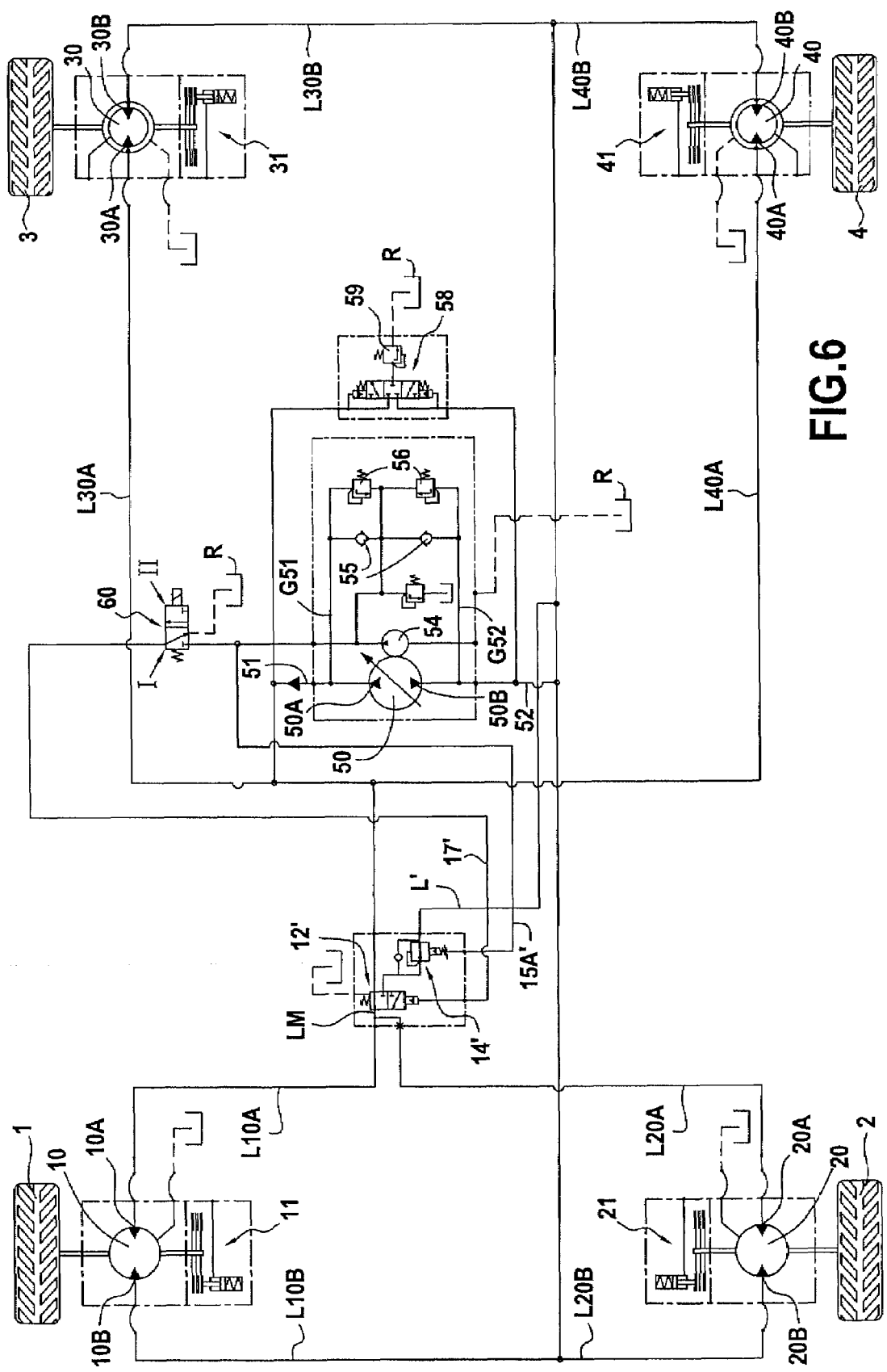
Figure 7:
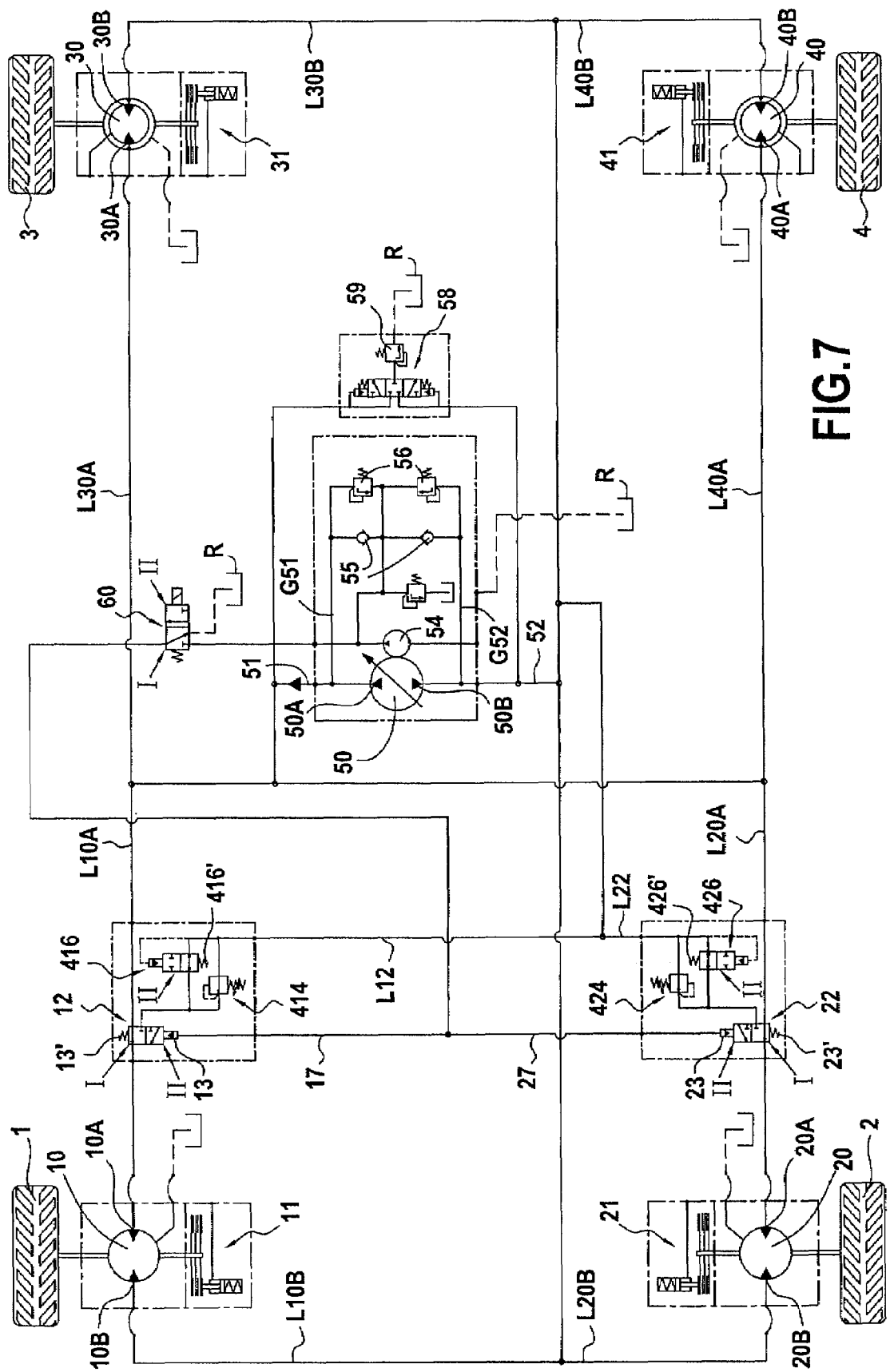

FIGS. 3, 4, and 5 show variants for the constriction valve and its control means;

FIG. 6 shows a variant using a constriction valve that is common to two motors; and FIG. 7 is a view analogous to the FIG. 1 view, for a variant embodiment.

DETAILED DESCRIPTION OF THE PREFERRED EMBODIMENTS

The vehicle driven by the apparatus whose hydraulic circuit is shown in FIG. 1 has two drive axles that are situated one behind the other in the direction of travel. In this example, each of the axles is provided with two wheels, respectively 1 and 2 for the first axle and 3 and 4 for the second axle. The wheels are coupled to respective ones of the motors 10, 20, 30, 40. In this example, each of the motors 10 and 20 of the wheels 1 and 2 is a motor having a single cylinder capacity, whereas each of the motors 30 and 40 of the wheels 3 and 4 is a motor having two cylinder capacities and having a cylinder capacity selector that is specific to it.

The circuit includes a main hydraulic pump 50 having two orifices, respectively 50A and 50B, and having a variable delivery rate.

The circuit also includes two main ducts, respectively a main duct 51 connected to the orifice 50A, and a main duct 52 connected to the orifice 50B. In a manner known per se, the apparatus includes a boost circuit including a booster pump 54 that, via check valves 55, can feed fluid to the ducts 51 or 52 via ducts G51, and G52 so as to avoid cavitation in the motors. Two pressure limiters 56 protect the circuit against excessive pressure.

The circuit includes a replenishing valve that is known per se and that comprises a low-pressure selector 58 connected to the main ducts and to an outlet duct for removing fluid to a pressure-free reservoir R, i.e. a reservoir without excessive pressure, via a pressure limiter 59.

By convention, the main ducts 51 and 52 are referred to below respectively as the "feed main duct" and as the "discharge main duct" since they serve respectively as feed and as discharge in the preferred direction of travel.

Each of the motors 10, 20, 30, and 40 has two main orifices, respectively 10A & 10B, 20A & 20B, 30A & 30B, and 40A & 40B.

The orifices 10A, 20A, 30A, and 40A are normally connected to the main feed duct 51, via respective link ducts L10A, L20A, L30A, and L40A. Similarly, the orifices 10B, 20B, 30B, and 40B are normally connected to the discharge main duct via respective link ducts L10B, L20B, L30B, and L40B. Thus, the motors are connected in parallel to the pump.

This "normal" situation corresponds to operation at reduced speed, in which all of the motors are active.

The circuit includes two bypass valves, respectively 12 and 22 that are respectively disposed on link ducts L10A and L20A.

More precisely, each bypass valve is disposed at a node between the link duct L10A, or L20A, the feed main duct 51, and a bypass link L12, or L22. The bypass links L12 and L22 are connected to the discharge main duct 52.

Each of the bypass valves 12 and 22 has a first position I, in which it establishes continuity in a respective one of the link ducts L10A and L20A, so as to enable the orifices 10A and 20A of the motors 10 and 20 to be connected to the feed main duct 51. Each of the bypass valves also has a second position II, in which it connects the corresponding one of the orifices 10A and 20A to the corresponding one of the bypass links L12 and L22.

For each of the bypass valves, said link is implemented via a constriction valve 14 or 24, disposed on the bypass link L12 or L22.

In this example, each of the constriction valves is formed by a pressure-reducing valve or pressure reducer that, at rest, makes it possible for substantially free flow to take place through the bypass link L12 or L22 whereas, when the pressure in the segment of the bypass link that extends between the constriction valve 14 or 24 and the bypass valve 12 or 22 (downstream from the pressure reducer) exceeds a threshold valve, said reducer restricts the fluid flow through the bypass link L12 or L22.

The above-mentioned threshold value can be the pressure rating of the return spring 15 or 25 of the pressure reducer. However, in the example shown, the reducer 15 or 25 has hydraulic control means connected to the booster via a pilot duct 15A or 25A, acting in the same direction as the spring. Thus, the threshold value for which the pressure reducer restricts the flow presents a constant difference with the boost pressure, which difference corresponds to the pressure rating of the spring.

The reducers 14 and 24 can be of a type known per se, each reducer having a moving element that, on moving, constricts the communication between the ports of the reducer.

Thus, the bypass link L12 or L22 is constricted progressively, depending on the position of the moving element of the pressure reducer 14 or 24.

Preferably, the springs 15 and 25 are of variable pressure rating.

It can be seen that, for each pressure reducer 14, 24, a check valve 16 or 26 is disposed in parallel with the reducer so as to allow free flow in the bypass link L12, L22, in the non-preferred direction of travel, in which the main duct 52 serves as fluid feed (while the vehicle is traveling in reverse) while the bypass valve is in the increased-speed position.

When it is desired to perform hydrostatic braking, while the vehicle is being driven in its preferred direction of travel, the pressure in the discharge main duct 52 is increased by reducing the cylinder capacity of the pump 50 and/or by slowing down the drive of the pump.

When no motor is bypassed, i.e. while the bypass valves 12 and 22 are in their positions I, the motors then behave as pumps and generate restraining torque that hydrostatically brakes the forward travel of the vehicle.

Conversely while the motors 10 and 20 are bypassed, i.e. while the bypass valves 12 and 22 are in their positions II, these bypassed motors do not normally contribute to the hydrostatic braking because the pressure is the same firstly at the connections 10A and 10B and secondly at the connections 20A and 20B. The constriction valves (pressure reducers) 14 and 24 then make it possible to restrict the flow of fluid through the bypass links L12 and L22. The constriction formed by the reducer 14 generates a pressure difference between the main orifices 10A and 10B of the motor 10, and the constriction formed by the reducer 24 generates a pressure difference between the main orifices 20A and 20B of the motor 20. Thus, the motors 10 and 20 contribute to the hydrostatic braking, in proportion to the pressure difference generated by the constrictions that are formed.

While the vehicle is being driven in its non-preferred direction of travel, the duct 52 serves as the fluid feed and is thus put at the high pressure, whereas the duct 51 that serves as the discharge is put at the low pressure. While the bypass valves 12 and 22 are in their positions I, the vehicle travels in its non-preferred direction at reduced speed (since no motor is bypassed), and hydrostatic braking operates normally. At increased speed, while the bypass valves 12 and 22 are in their positions II, the motors 10 and 20 can be bypassed because the check valves 16 and 26 allow unrestricted fluid flow to take place in the bypass links, thereby putting the main orifices 10A and 20A at the feed high pressure. In this situation, if hydrostatic braking is required, then the motors 10 and 20 do not contribute to said hydrostatic braking. This is not generally problematic since the vehicle is traveling in the non-preferred direction of travel.

It should be noted that, in the example shown, each of the motors 10, 20, 30, and 40 has mechanical braking means, respectively 11, 21, 31, and 41, of a type known per se. Thus, mechanical braking can be implemented in a manner complementary to the hydrostatic braking or can be used by way of an emergency brake.

The bypass valves 12 and 22 are controlled hydraulically. For each of these valves, the apparatus has a respective pilot duct 17 or 27 suitable for being connected or not connected to a pressure source which, in this example, is the booster pump 54. For this purpose, the apparatus includes a selection solenoid valve 60 having two positions. In its position I, as shown, the valve 60 connects the pilot ducts 17 and 27 to the pressure-free reservoir R, so that the control chambers 13 and 23 of the bypass 12 and 22 are not fed with fluid under pressure, and so that these valves take up their rest positions I, by being urged back into these positions by return springs, respectively 13' and 23'.

When the solenoid valve 60 is excited so as to cause it to go into its position II, it connects the pilot ducts 17 and 27 to the booster pump 54, thereby making it possible to feed the hydraulic control chambers 13 and 23 of the valves 12 and 22, so as to place them in their positions II.

Figure 2:
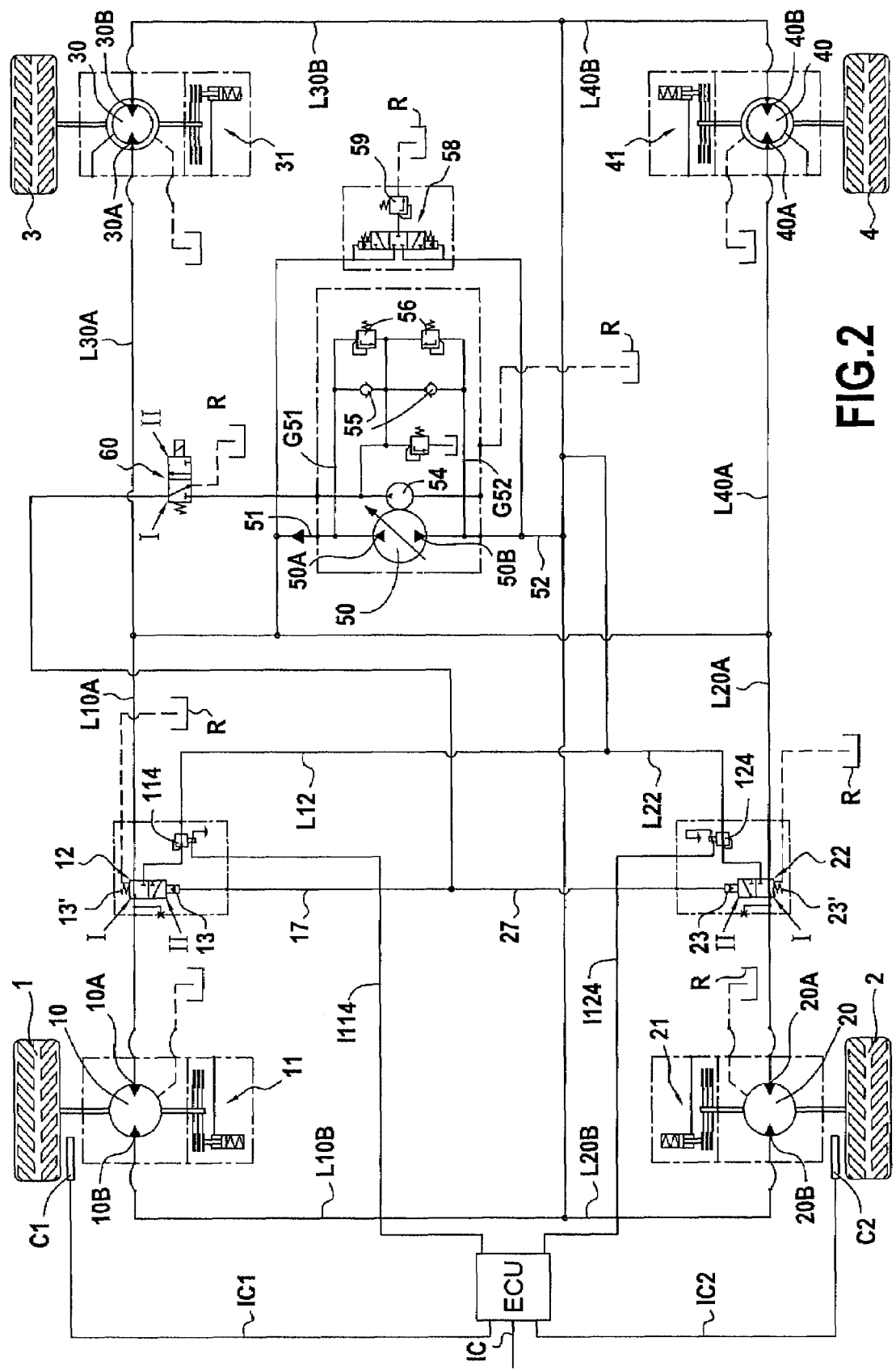
FIG. 2 is a circuit diagram of the same type, for a second embodiment.

A description follows of FIG. 2, concentrating on those elements that differ from the elements of FIG. 1, the others being designated by references that are unchanged. In FIG. 2, the pressure-reducing valves 114 and 124 that are disposed on respective ones of the bypass links L12 and L22 are electrically-controlled pressure reducers. In the absence of any imposed control, they are in their free configuration and allow substantially free flow through the respective bypass links L12 and L22. Conversely, they can be electrically controlled, via respective ones of control lines l114 and l124, to restrict the flow of fluid in the bypass link.

The apparatus includes an Electronic Control Unit (ECU) that, on the basis of information relating to the conditions of travel of the vehicle, can either allow the constriction valves 114 and 124 to go into their constricted configurations or else prevent them from going into said configurations. This information can come from sensors C1 and C2 associated with the wheels 1 and 2 of the vehicle, and connected to the ECU via respective lines lC1 and lC2. In a first variant, said sensors serve to detect the direction of travel of the vehicle. When they detect travel in the non-preferred direction, they transmit corresponding information to the ECU, so that the ECU prevents the constriction valves 114 and 124 from going into their constricted configurations while the bypass valves 12, 22 are in their increased-speed positions.

It should be noted that the information relating to the direction of travel of the vehicle can be detected by any suitable means and can be transmitted to the ECU via a control line lC. The information relating to the direction of travel of the vehicle can also be given, for example, on the basis of the position of the control lever (joystick) of the vehicle or of a forward/reverse direction switch present on the dashboard.

In general, the ECU can receive any information relating to the conditions of travel or of load of the vehicle and, as a function of this information, can allow the valves 114 and 124 to go into their constricted configurations or prevent them from going into said constricted configurations.

The information relating to the travel conditions can relate not only to the direction of travel of the vehicle, but also to the speed thereof (it being possible for the vehicle speed to be detected by sensors C1 and C2 associated with the wheels).

In which case, constriction of the bypass link can be prevented even in the preferred direction of travel.

In the same way as for the valves 14 and 24, the constrictions of the bypass links 12 and 22 implemented by the valves 114 and 124 are advantageously progressive, depending on the positions of the moving elements of said valves.

In the embodiments described above with reference to FIGS. 1 and 2, the constriction valves are implemented in the form of pressure reducers that are controlled by the downstream pressure (reducers 14, 24 of FIG. 1) or electrically (reducers 114, 124 of FIG. 2).

Any other type of constriction valve can be imagined, and the control means for controlling the constriction valve can be chosen from among electrical means, mechanical means, and hydraulic means.

For example, FIG. 3 shows the use, as a constriction valve, of a variable-constriction valve 214 having direct proportional electrical control. The valve 214 is urged by a return spring 215 back into its rest configuration, in which it allows free flow though it and thus in the bypass link L.

The variant shown in FIG. 4 also shows a variable-constriction valve 214' that has proportional electrical control, and, in known manner, that can have a hydraulic pilot stage. In which case, a pressure reducer 216 having proportional electrical control makes it possible to feed the hydraulic control chamber of the variable-constriction valve 214' at the pressure corresponding to the desired level of braking from a pressurized fluid source S.

FIG. 5 shows the use, as a constriction valve, of a variable-constriction valve 314 that is controlled as a function of the stroke of a control member 380 that is itself controlled by control means 382 connected to an ECU such as, for example, the ECU of FIG. 2. For example, activation of a braking command at a certain level of braking demand, e.g. by acting on the joystick via which the driver drives the vehicle, or indeed on a braking activation member such as a brake pedal or the like, can cause the ECU to give a control instruction to the means 382 to move the member 380 in such a manner as to constrict the through flow section of the valve 314 to a greater or to a lesser extent, as a function of the braking demand.

The advantage of such variable-constriction valves is to make it possible to restrict the flow of fluid in both directions of flow of the bypass link L.

Advantageously, the control means of the constriction valve are suitable for causing the valve to move in such a manner as to servo-control a variable representative of operation of the vehicle to a setpoint. This applies in particular when said control means comprise an ECU. In particular, the variable representative of operation of the vehicle can be the pressure or the flow rate in one of the main ducts 51 and 52, the output torque of one or more motors, their output speeds, the speed of the vehicle, the distance traveled by said vehicle, its position or its distance relative to a target, the acceleration or deceleration of the vehicle, or of the motors, or, for example, an operating parameter of the drive motor of the pump 50 (number of revolutions, speed, torque of said motor, etc.), or a combination of the above-mentioned parameters.

The representative variable can be computed as a function of the control of the various elements in question, by the ECU, but the apparatus advantageously includes means for detecting the value of said variable or the values of the parameters serving to compute it.

On the basis of the value detected and/or computed (e.g. by a microprocessor that is associated with the ECU or that is part of said ECU) for the representative value, the ECU can then compare said value with the stored setpoint, and respond to said comparison by issuing a control signal for controlling said constriction valve. The setpoint is chosen such as to make it possible to obtain the additional hydrostatic braking torque during hydrostatic braking under good conditions, while the bypass valve is in its position II. The means for storing the setpoint can be contained in a memory of a microprocessor.

Advantageously, for issuing the control signal for controlling the constriction valve, the apparatus includes a regulation system of the Proportional-Integral-Derivative (PID) type.

The setpoint used for the servo-control is advantageously a variation relationship for the variable representative of operation of the motor.

When the servo-control is implemented on the pressure in the feed duct 52, it can make it possible to prevent the drive motor of the pump 50 from racing, by making provision for said pressure not to exceed a defined value in hydrostatic braking.

The servo-control used for causing the bypass link to be constricted can also be used for accessory functions such as assisting with turning of the vehicle, because the servo-control makes it possible to increase the hydrostatic braking by then braking the wheel on the inside of the turn, or balancing the front/rear braking of the various drive wheels of the vehicle, or indeed braking of the Anti-lock Braking System (ABS) type.

In the description of FIGS. 1 and 2, the constriction valves 14 and 24 or 114 and 124 are described together.

In accordance with the invention, at least one constriction valve is present so as to make it possible to restrict the flow of fluid through the bypass link of one motor or of a plurality of motors of the same axle.

It can be advantageous to provide a bypass valve 12 and a constriction valve of the same type as the above-described valves 14, 114, 214, 214' or 314 that are common to both of the motors 1 and 2, by being disposed on a common bypass link.

This is what is shown in FIG. 6, for a constriction valve 14' analogous to the valve 14. In which case, the bypass valve 12', analogous to the valve 12, is connected firstly to a common link duct LM between the orifice 10A of the motor 10 and the orifice 20A of the motor 20, and secondly to the feed main duct 51, and to a common constriction valve 14'. The control chamber of the valve 12' is connected to a pilot duct 17'. The common constriction valve 14' is connected to a common bypass link L'. As in FIG. 1, a check valve can be disposed in parallel with said valve so as to allow free flow through said bypass link L' in the non-preferred direction. As in FIG. 1, the valve 14' is connected to the booster via a pilot valve 15A', associated with its return spring.

This solution makes it possible to economize by omitting piping and components. However, it can be advantageous, as shown in FIGS. 1 and 2, to provide a bypass valve and a constriction valve that are associated with one of the motors (10) for the bypass links (L12) of said motor, and an additional bypass valve (22) and an additional constriction valve (24) that are associated with an additional motor (20), the additional constriction valve (24) being disposed on an additional bypass link (L22). This makes it possible to manage distinctly the flows in the two motors in question so as to make it possible to restrict these flows independently.

Advantageously, the bypass valve and the constriction valve are disposed in the same valve unit.

FIG. 7 is a view analogous to the FIG. 1 view, so that only those elements that are different relative to FIG. 1 are described below.

In FIG. 7, the constriction valves are formed by conventional pressure reducers 414, 424 controlled by the pressure upstream from them. Each of the pressure reducers is bypassed by a respective constriction bypass valve 416 or 426. The valves 416 and 426 are controlled hydraulically by the pressure in the respective bypass links L12 and L22, in opposition to the return force from respective springs 416' and 426'.

In the free state, the valves 416 and 426 take up their positions I, in which they are shown and that allow free flow through the bypass link (through the constriction bypass valves) in both directions of flow of the fluid. When the pressure in the bypass link L12, L22 reaches a sufficient value, the valves 416 and 426 go into their positions II. These positions II are active constriction positions in which the flow of fluid through the bypass links does not go via the constriction bypass valves, but rather it goes via the pressure reducers 414, 424 that thus restrict the flow through the bypass links.

Thus, when the motors 10, 20 are bypassed and while the vehicle is traveling without being braked, the fluid can flow freely through the bypass links, without going via the pressure reducers 414, 424, thereby avoiding any risk of cavitation in the feed and discharge ducts of the bypassed motors.

During braking, the fluid pressure increases in said ducts, thereby causing the valves 416, 426 to go into their active constriction positions II, and enabling the pressure reducers 414 and 424 to play their part in increasing the braking torque.

It should be noted that the constriction bypass valves 416 and 426 can be two-position valves, or indeed progressive valves. When they are progressive, as soon as the valves leave their positions I to go towards their positions II, each of them gives rise to head loss between its two terminals, thereby already facilitating increasing the braking torque.

The motors suitable for being bypassed can be of a plurality of cylinder capacities or of variable cylinder capacity so as to have additional ranges of speed, e.g. so as to drive four wheels when working on difficult terrain over two ranges of speed. On the road, at very high speed, a reduced cylinder capacity in the bypassed motor makes it possible to reduce the flow rate flowing through the bypass links and through the constriction valves, thereby making it possible to use valves that are less expensive. This also offers the advantage of obtaining low additional braking on the road with the possibility of obtaining stronger braking by causing the motor to go over to its high cylinder capacity if the need arises.

The invention claimed is:

1. Hydrostatic transmission apparatus for a vehicle having at least two drive members disposed one after the other in a direction of travel of said vehicle, the apparatus comprising at least two hydraulic motors suitable for driving respective ones of said drive members, each hydraulic motor having two main orifices serving respectively as feed and as discharge in a preferred direction of travel of the vehicle, a main hydraulic pump connected to two main ducts that serve respectively as feed and as discharge in the preferred direction, and a bypass valve suitable for taking up a reduced-speed position in which the feed main orifices of the motors are connected to the feed main duct, while the discharge main orifices are connected to the discharge main duct, and an increased-speed position in which at least one motor is bypassed, the feed main orifice of said bypassed motor being connected to the discharge main duct via a bypass link, while the other main orifices continue to have their respective links, said apparatus further comprising constriction means suitable for being activated to restrict the flow of fluid through said bypass link, so as to put the two main orifices of said bypassed motor at different pressures.

2. Apparatus according to claim 1, wherein the bypass link extends between the discharge main duct and the bypass valve.

3. Hydrostatic transmission apparatus for a vehicle having at least two drive members disposed one after the other in a direction of travel of said vehicle, the apparatus comprising at least two hydraulic motors suitable for driving respective ones of said drive members, each hydraulic motor having two main orifices serving respectively as feed and as discharge in a preferred direction of travel of the vehicle, a main hydraulic pump connected to two main ducts that serve respectively as feed and as discharge in the preferred direction, and a bypass valve suitable for taking up a reduced-speed position in which the feed main orifices of the motors are connected to the feed main duct, while the discharge main orifices are connected to the discharge main duct, and an increased-speed position in which at least one motor is bypassed, the feed main orifice of said bypassed motor being connected to the discharge main duct via a bypass link, while the other main orifices continue to have their respective links, said apparatus further comprising a constriction valve suitable, in a free configuration, for enabling fluid to flow substantially freely in said bypass link when the fluid pressure in said link is less than a pressure threshold, and, in a constricted configuration, for restricting the flow of fluid in said link when said pressure is greater than said pressure threshold, so as to put the two main orifices of said bypassed motor at different pressures.

4. Apparatus according to claim 3, wherein the bypass link extends between the discharge main duct and the bypass valve.

5. Apparatus according to claim 3, wherein the constriction valve is disposed in the bypass link.

6. Apparatus according to claim 3, further comprising a check valve that is disposed in parallel with the constriction valve so as to allow free flow in the bypass link, in the non-preferred direction of travel.

7. Apparatus according to claim 3, further comprising a constriction bypass valve disposed in parallel with the constriction valve and suitable for taking up a constriction bypassed position allowing free flow in the bypass link, and a constriction active position in which the flow of fluid in the bypass link goes via the constriction valve.

8. Apparatus according to claim 3, wherein the constriction valve is prevented from going into said constricted configuration when the non-preferred direction of travel is detected.

9. Apparatus according to claim 1, further comprising an electronic control unit that is suitable for acting on the basis of information relating to the conditions of travel of the vehicle either to allow the constriction means to go into a constricted configuration or to prevent it from going into a constricted configuration.

10. Apparatus according to claim 3, further comprising an electronic control unit that is suitable for acting on the basis of information relating to the conditions of travel of the vehicle either to allow the constriction valve to go into said constricted configuration or to prevent it from going into said constricted configuration.

11. Apparatus according to claim 3, wherein the constriction valve is a pressure-reducing valve.

12. Apparatus according to claim 3, wherein the constriction valve is a variable constriction valve that is controlled proportionally.

13. Apparatus according to claim 1, wherein the bypass valve is controlled hydraulically.

14. Apparatus according to claim 13, wherein, in order to control the bypass valve, said apparatus further comprises a pilot duct suitable for being connected or not connected to a pressure source.

15. Apparatus according to claim 3, wherein the bypass valve is controlled hydraulically.

16. Apparatus according to claim 3, wherein, in order to control the bypass valve, said apparatus further comprises a pilot duct suitable for being connected or not connected to a pressure source.

17. Apparatus according to claim 1, further comprising at least one additional motor that, in the reduced-speed position, has respective feed and discharge main orifices thereof connected respectively to the feed and discharge main ducts and that, in the increased-speed position, has the feed main orifice thereof connected to the discharge main duct via an additional bypass link, whereas the discharge main orifice of said additional motor remains connected to the discharge main duct, and said apparatus further comprising additional constriction means suitable for being activated to restrict the flow of fluid in said additional bypass link.

18. Apparatus according to claim 3, further comprising at least one additional motor that, in the reduced-speed position, has respective feed and discharge main orifices thereof connected respectively to the feed and discharge main ducts and that, in the increased-speed position, has the feed main orifice thereof connected to the discharge main duct via an additional bypass link, whereas the discharge main orifice of said additional motor remains connected to the discharge main duct, and said apparatus further comprising an additional constriction valve suitable for being activated to restrict the flow of fluid in said additional bypass link.

19. Apparatus according to claim 1, further comprising at least one additional motor that, in the reduced-speed position, has respective feed and discharge main orifices thereof connected respectively to the feed and discharge main ducts and that, in the increased-speed position, is bypassed by having the feed main orifice thereof connected to the discharge main duct via the bypass link, which link is common to said bypassed additional motor and to said at least one bypassed motor, whereas the discharge main orifices of said bypassed motors are connected to the discharge main duct, wherein the constriction means are suitable for being activated to restrict the flow of fluid in said common bypass link.

20. Apparatus according to claim 3, further comprising at least one additional motor that, in the reduced-speed position, has respective feed and discharge main orifices thereof connected respectively to the feed and discharge main ducts and that, in the increased-speed position, is bypassed by having the feed main orifice thereof connected to the discharge main duct via the bypass link, which link is common to said bypassed additional motor and to said at least one bypassed motor, whereas the discharge main orifices of said bypassed motors are connected to the discharge main duct, wherein the constriction valve is suitable for being activated to restrict the flow of fluid in said common bypass link.

21. Apparatus according to claim 3, further comprising control means for controlling the constriction valve, which control means are suitable for controlling said valve as a function of the stroke of a control member.

22. Apparatus according to claim 3, further comprising a controller for controlling the constriction valve, which controller is suitable for causing said valve to move in such a manner as to servo-control a variable representative of operation of the vehicle to a setpoint.

23. Apparatus according to claim 22, wherein the controller comprises a memory for storing the setpoint and an electronic control unit suitable for receiving the detected value for the representative value, for comparing said value with the stored setpoint, and for responding to said comparison by issuing a control signal.

24. Apparatus according to claim 3, further comprising a controller for controlling the constriction valve, which controller is chosen from among electrical means, mechanical means, and hydraulic means.

25. Apparatus according to claim 24, wherein the controller is a hydraulic controller including a pressure reducer.

26. Apparatus according to claim 24, wherein the controller is a hydraulic controller including a pressure regulator.

27. Apparatus according to claim 3, wherein the constriction of the bypass link is progressive, depending on the position of the constriction valve.

\* \* \* \* \*